United States Patent
Duleba

(10) Patent No.: US 10,366,422 B2
(45) Date of Patent: Jul. 30, 2019

(54) QUALITY VISIT MEASURE FOR CONTROLLING COMPUTER RESPONSE TO QUERY ASSOCIATED WITH PHYSICAL LOCATION

(71) Applicant: Google Inc., Mountain View, CA (US)

(72) Inventor: Krzysztof Duleba, Seattle, WA (US)

(73) Assignee: Google LLC, Mountain View, CA (US)

( * ) Notice: Subject to any disclaimer, the term of this patent is extended or adjusted under 35 U.S.C. 154(b) by 781 days.

(21) Appl. No.: 14/849,368

(22) Filed: Sep. 9, 2015

(65) Prior Publication Data

US 2017/0069000 A1  Mar. 9, 2017

(51) Int. Cl.
*G06Q 30/02* (2012.01)
*G06Q 50/00* (2012.01)
*G06F 16/23* (2019.01)
*G06F 16/248* (2019.01)
*G06F 16/9535* (2019.01)
*G06F 16/2457* (2019.01)
*G06F 16/9537* (2019.01)

(52) U.S. Cl.
CPC ......... *G06Q 30/0282* (2013.01); *G06F 16/23* (2019.01); *G06F 16/248* (2019.01); *G06F 16/24575* (2019.01); *G06F 16/24578* (2019.01); *G06F 16/9535* (2019.01); *G06F 16/9537* (2019.01)

(58) Field of Classification Search
CPC combination set(s) only.
See application file for complete search history.

(56) References Cited

U.S. PATENT DOCUMENTS

| | | | |
|---|---|---|---|
| 8,768,379 B2 * | 7/2014 | Busch | H04W 4/029 455/456.1 |
| 8,838,586 B2 | 9/2014 | Waldman et al. | |
| 2006/0123014 A1 | 6/2006 | Ng | |
| 2008/0059455 A1 * | 3/2008 | Canoy | G06F 17/30867 |
| 2014/0088856 A1 | 3/2014 | Wouhaybi et al. | |
| 2014/0259189 A1 * | 9/2014 | Ramachandran | H04W 4/21 726/30 |
| 2014/0379696 A1 | 12/2014 | Gyongyi et al. | |
| 2015/0100383 A1 | 4/2015 | Chauhan | |

FOREIGN PATENT DOCUMENTS

| | | |
|---|---|---|
| WO | WO 2008/134595 | 11/2008 |
| WO | WO 2009/055501 | 4/2009 |
| WO | WO 2013/192586 | 12/2013 |

OTHER PUBLICATIONS

Boyd, Danah and Ellison, Nicole (2008) "Social Network Sites: Definition, History, and Scholarship", Journal of Computer-Mediated Communication 13, 21-230. (Year: 2008).*
International Search Report from PCT/US2016/050914 dated Dec. 16, 2016—5 pages.

* cited by examiner

*Primary Examiner* — Mark A Fleischer
(74) *Attorney, Agent, or Firm* — Dority & Manning, P.A.

(57) ABSTRACT

The response of a computer to a query associated with a physical location may be controlled using a quality visit measure that is based at least in part on the number and/or frequency of repeat visits by one or more individuals to that physical location.

20 Claims, 4 Drawing Sheets

QUALITY VISIT MEASURE FOR CONTROLLING COMPUTER RESPONSE TO QUERY ASSOCIATED WITH PHYSICAL LOCATION

BACKGROUND

Aspects of physical locations, such as business establishments, may be determined from Internet documents that are related to the physical locations and/or explicit input of individuals that are related to the physical locations. For example, a webpage related to a business may be analyzed to identify a category of the business, a location of the business, etc. As another example, reviews submitted by users related to a business may be analyzed to determine an overall rating of the business. As yet another example, an owner of the business or another user may manually input information to a service that maintains business information to have the business information reflected by the service. For instance, an owner may enter the address, operating hours, webpage, and other information related to the business. However, reliance solely on such aspects may have one or more drawbacks. For example, such aspects may not be available for many physical locations, may contain significant bias, may be outdated, may not be based on reliable data, and/or may not include certain unique aspects.

SUMMARY

This specification is directed generally to technical features for controlling the response of a computer to a query associated with a physical location using a quality visit measure that is based at least in part on the number and/or frequency of repeat visits by one or more individuals to that physical location. In this manner, data related to visits by one or more individuals to a physical location may be used as an indication of the popularity of that location, with the incidences of repeat visits used to effectively incorporate the "quality" of visits into the popularity indication.

In some implementations, for example, computer interaction data associated with actual visits to a physical location may be used to determine a quality visit measure for the physical location, which in turn may be used to control a computer response to a query associated with the physical location. Further, in some implementations, the quality visit measure may be based at least in part on the number and/or frequency of repeat visits by an individual, and weighted to emphasize greater numbers of repeat visits by individuals.

Controlling a computer response to a query based upon a quality visit measure determined from data related to repeat visits by individuals to a physical location gives rise to various technical advantages. For example, in some implementations the determination of such data and/or a quality visit measure may improve the accuracy of information that is identified as relevant to the query and/or provide information with an appropriate prominence to increase the likelihood that the information will be consumed in response to the query. Doing so may also decrease the likelihood that further searches will be needed to identify information, thereby preventing consumption of network and computer resources in response to such subsequent, and otherwise unnecessary, queries.

Therefore, in some implementations, a computer implemented method includes determining, by one or more processors, a group of computing interactions by one or more individuals pertaining to a physical location, wherein the computing interactions of the group are each indicative of an actual visit to the physical location by the one or more individuals; determining, by the one or more processors, from the determined group of computing interactions a number of actual visits to the physical location by each of the one or more individuals; determining, by the one or more processors, a quality visit measure for the physical location based at least in part on the determined number of actual visits to the physical location by each of the one or more individuals, including weighting the quality visit measure to emphasize greater numbers of repeat visits by an individual among the one or more individuals; and controlling, by the one or more processors, a computer response to a query associated with the physical location using the determined quality visit measure.

In some implementations, the method may also include determining from the determined number of actual visits to the physical location a plurality of visitor counts, each of the plurality of visitor counts associated with a predetermined number of actual visits and equal to a number of individuals among the one or more individuals determined to have the predetermined number of actual visits to the physical location, where weighting the quality visit measure includes weighting the quality visit measure based upon the plurality of visitor counts. In some implementations, weighting the quality visit measure based upon the plurality of visitor counts includes applying a different weight to each of the plurality of visitor counts, and in some implementations, determining the quality visit measure includes determining the quality visit measure based upon a function of $C_i$, $w_i$, $C_0$ and N, where $C_i$ is the visitor count equal to the number of individuals among the one or more individuals having visited the physical location i times, $w_i$ is the weight applied to visitor count $C_i$, $C_0$ is an offset that deemphasizes the quality visit measure for the physical location in response to a dearth of determined computing interactions for the physical location, and N is the number of visitor counts for the physical location. Further, in some implementations, weights $w_1 \ldots w_N$ increase from $w_1$ to $w_N$ to emphasize when an individual among the one or more individuals visits the physical location many times.

In some implementations, the method also includes restricting the group of computing interactions to computing interactions of individuals matching an individual characteristic criterion, while in some implementations, the method includes restricting the group of computing interactions to computing interactions associated with actual visits matching a temporal criterion.

In some implementations, the method also includes detecting a recommendation of the physical location made by a first individual, and determining from the determined group of computing interactions an actual visit made to the physical location by a second individual after the recommendation made by the first individual, where determining the quality visit measure for the physical location is further based at least in part on the determined actual visit made to the physical location by the second individual after the recommendation made by the first individual.

In addition, in some implementations, the method also includes determining from the determined group of computing interactions a first actual visit made to the physical location by a first individual, and determining from the determined group of computing interactions a second actual visit made to the physical location by a second individual that is a friend of the first individual, where determining the quality visit measure for the physical location is further based at least in part on the second actual visit being made to the physical location by the second individual after the first actual visit made by the first individual. Further, in some implementations, the method also includes determining from the determined group of computing interactions that the second individual visited the physical location with the first individual, where determining the quality visit measure for the physical location is further based at least in part on the second actual visit being made to the physical location by the second individual with the first individual after the first actual visit made by the first individual.

In some implementations, each computing interaction is determined based upon a location of a computing device of an individual, a navigation request made by an individual, a check-in by an individual, or geotag data of an electronic file of an individual. In some implementations, the physical location is associated with a point of interest, the query is a user-generated query for points of interest within a geographical area or for points of interest of a category, and controlling the computer response to the query associated with the physical location using the determined quality visit measure includes ranking an information entry associated with the physical location relative to other information entries associated with other physical locations matching the query based at least in part on the determined quality visit measure, and generating a search result response to the query including the information entry associated with the physical location. In some such implementations, generating the search result response includes including with the information entry additional information associated with the determined quality visit measure.

Also, in some implementations, the physical location is associated with a point of interest, the query is a user-generated structured query for points of interest matching a visit quality criterion, and controlling the computer response to the query associated with the physical location using the determined quality visit measure includes including an information entry associated with the physical location in a search result response based at least in part based upon the determined quality visit measure meeting the visit quality criterion. Further, in some implementations, the query is a query for information about the physical location, and controlling the computer response to the query associated with the physical location using the determined quality visit measure includes including information associated with the determined quality visit measure with an information entry associated with the physical location in a search result response.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
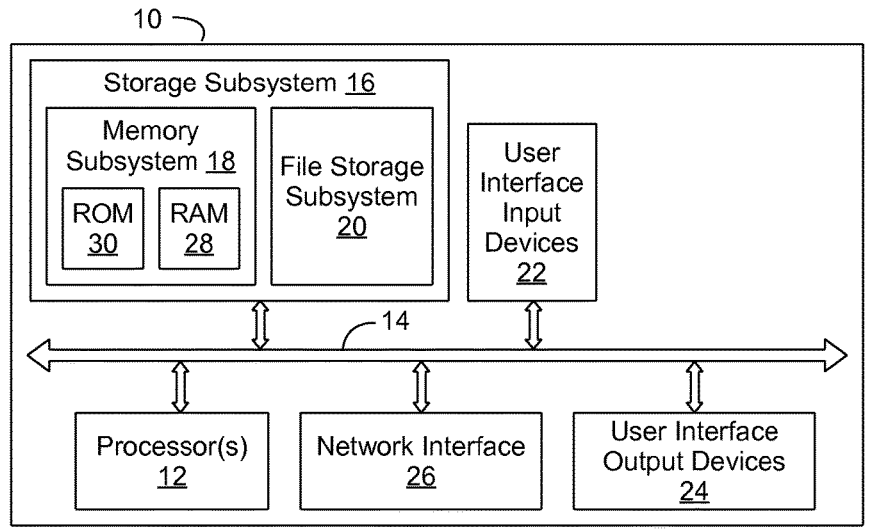
FIG. 1 illustrates an example architecture of a computer system.

In the implementations discussed hereinafter, data related to visits by one or more individuals to a physical location such as a place of business is used as an indication of popularity, with particular emphasis placed on subsequent or repeat visits by an individual to the physical location.

It has been found, for example, that finding a "good" restaurant can be a challenge, often due to the fact that web mentions and reviews can be unreliable indicators of restaurant quality. Web mentions may not focus sufficiently on quality, as some mentions may be negative due to an isolated bad experience, as well as the fact that as less popular restaurants may not have sufficient mentions from which to derive sufficient information. Reviews may require substantial efforts on the part of users, and may be written by unreliable authors having an axe to grind and/or having insufficient understanding of the subject matter.

On the other hand, the actual patronage of individuals at restaurants and other place of businesses in many instances can provide an indication of the quality of such establishments in a way that does not have the same dependencies on any potential biases of those individuals and does not require any conscious effort on the part of those individuals. If an individual has an unpleasant experience at a restaurant, that individual is less likely to ever return, so regardless of whether or not the individual makes the effort to write a negative review or web mention, the fact that the individual never returns is likely a good indicator that the individual does not particularly like the restaurant. Consequently, the fact that an individual is found to return to a restaurant multiple times and/or on a regular basis may be an indication that the individual likes the restaurant, as an individual that has a good experience at a restaurant is in general more likely to return for another visit. In addition, in some implementations, an assumption may be made that the more times an individual visits the same restaurant, the more likely it is that the individual considers the restaurant to be a quality place of business.

As such, in some implementations, a ranking signal referred to herein as a "quality visit measure" may be used as an indication of the relative quality of a physical location based upon visits made to that location. A physical location, in this regard, may be considered to represent a point of interest, often a business establishment, and an actual visit represents an individual's actual physical presence at a physical location. An actual visit, in some implementations, may be required to be of a sufficient duration to quality as a visit to the physical location, and the duration required may be dependent upon the type of physical location. As but one example, for a full service restaurant, a visit that only lasts 5 minutes or less may be disregarded as an actual visit since 5 minutes would be insufficient time to order and consume a meal at the restaurant, while for a dry cleaner or even a takeout restaurant, a 5 minute visit would still be sufficient to indicate an actual visit to the establishment.

In some implementations, visits may be determined based upon analysis of a group of computing interactions stored in one or more databases, and pertaining to one or more individuals who have been determined to have visited the physical location. Computing interactions, for example, may be based upon GPS location data, "check-ins" by individuals using social media or other online services, geotagged pictures or videos, navigation requests, etc., as will become more apparent below.

In some implementations, the group of computing interactions may be analyzed to determine a number of actual visits to a physical locations by each individual, and from the determined numbers of actual visits, a quality visit measure may be determined. Further, the quality visit measure may be weighted to emphasize greater numbers of repeat visits by different individuals. Thus, for example, if it is found that certain individuals frequent a physical location on a regular basis, or that a large number of individuals return to a physical location multiple times, a greater quality visit measure may be determined. It will also be appreciated that in addition to or in lieu of accumulating counts of actual visits, some implementations may determine frequencies of actual visits to physical locations related to numbers of visits within a time frame and/or amount of time between visits, e.g., to determine physical locations that are visited by an individual once per week, six times a month, etc.

The quality visit measure may be used, in some implementations, to rank a physical location higher in a list of search results. Thus, for example, if a user is searching for a restaurant in a particular geographical area, a restaurant having a relatively high quality visit measure may be promoted over other restaurants in the same area due to the frequency of revisits by other individuals. In some implementations, a quality visit measure may be used as part of a structured query, e.g., so that a user could search only for restaurants with many "regulars" or repeat customers determined to have visited N or more times. Further, in some implementations, a quality visit measure may be used to provide information about a physical location, even to a proprietor of a physical location (e.g., "36% customers have visited 5+ times, 24% customers have visited 2-4 times," etc.).

In some implementations, a quality visit measure may be based upon accumulated visit counts for a plurality of individuals, referred to herein as a repeat visit measure. In one implementation, for example, where there are multiple individuals and multiple physical locations, each individual may be processed by listing all of the physical locations visited by that individual, making a note of the number of times each physical location was visited by that user. Then, every physical location may be processed to count the number of individuals that visited the physical location 1 time, 2 times, 3 times, etc. Then, these counts may be weighted and combined to generate the quality visit measure for each physical location. For example, in some implementations, weights may be determined empirically to emphasize greater numbers of visits by individuals, such that individuals visiting only once are strongly deemphasized whereas individuals visiting numerous times are strongly emphasized.

In some implementations, a quality visit measure may also incorporate additional considerations. For example, specific scenarios that may be particularly indicative of quality may be incorporated into a calculation, and may be used as a type of quality visit measure that may be used individually or in combination with other types of quality visit measures, often using relationships between multiple individuals to identify particular types of actual visits.

In some implementations, for example, the fact that an individual visited a physical location or point of interest (e.g., a restaurant) once and then later returned with a friend may be considered to be indicative of the fact that the individual liked the restaurant. As such, another type of quality visit measure, referred to herein as a "brought a friend" visit measure, may be used as an indication of the prevalence of individuals to bring others to a physical location. With such a measure, for example, actual visits by individuals that are identified as connected through social media may be analyzed to detect when multiple individuals have visited a physical location at the same time, and then other visits by any of those individuals prior to the joint visits may be identified and effectively linked to the joint visits to generate a measure that is indicative of the likelihood of individuals to bring along friends to particular physical locations.

Also, in some implementations, the fact that an individual received a recommendation for a physical location or point of interest (e.g., a restaurant) from a friend and later visited the restaurant may be considered to be indicative of the fact that the friend liked the restaurant. As such, another type of quality visit measure, referred to herein as a "recommended" visit measure, may be used as an indication of the prevalence of individuals to find a physical location of sufficient quality to make recommendations to others in their social network. With such a measure, for example, mentions or recommendations of a physical location by an individual may be identified, e.g., from social media, and subsequent visits to the physical location by others connected to that individual via the social media (e.g., within a particular time frame) may effectively be tied back to the individual making the recommendation as a further indication of that individual's opinion of the physical location.

In addition, the aforementioned types of quality visit measures may be combined in some implementations. For example, in some implementations, the individual measures may be summed together after weighting some or all of the individual measures using empirically-determined weights.

Further details regarding selected implementations are discussed hereinafter. It will be appreciated however that other implementations are contemplated so the implementations disclosed herein are not exclusive.

Now turning to the Drawings, wherein like numbers denote like parts throughout the several views, FIG. 1 is a block diagram of electronic components in an example computer system 10. System 10 typically includes at least one processor 12 that communicates with a number of peripheral devices via bus subsystem 14. These peripheral devices may include a storage subsystem 16, including, for example, a memory subsystem 18 and a file storage subsystem 20, user interface input devices 22, user interface output devices 24, and a network interface subsystem 26. The input and output devices allow user interaction with system 10.

Network interface subsystem 26 provides an interface to outside networks and is coupled to corresponding interface devices in other computer systems.

In some implementations, user interface input devices 22 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 10 or onto a communication network.

User interface output devices 24 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 10 to the user or to another machine or computer system.

Storage subsystem 16 stores programming and data constructs that provide the functionality of some or all of the modules described herein. For example, the storage subsystem 16 may include the logic to perform selected aspects of the methods disclosed hereinafter.

These software modules are generally executed by processor 12 alone or in combination with other processors. Memory subsystem 18 used in storage subsystem 16 may include a number of memories including a main random access memory (RAM) 28 for storage of instructions and data during program execution and a read only memory (ROM) 30 in which fixed instructions are stored. A file storage subsystem 20 may provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 20 in the storage subsystem 16, or in other machines accessible by the processor(s) 12.

Bus subsystem 14 provides a mechanism for allowing the various components and subsystems of system 10 to communicate with each other as intended. Although bus subsystem 14 is shown schematically as a single bus, alternative implementations of the bus subsystem may use multiple busses.

System 10 may be of varying types including a mobile device, a portable electronic device, an embedded device, a desktop computer, a laptop computer, a tablet computer, a wearable device, a workstation, a server, a computing cluster, a blade server, a server farm, or any other data processing system or computing device. In addition, functionality implemented by system 10 may be distributed among multiple systems interconnected with one another over one or more networks, e.g., in a client-server, peer-to-peer, or other networking arrangement. Due to the ever-changing nature of computers and networks, the description of system 10 depicted in FIG. 1 is intended only as a specific example for purposes of illustrating some implementations. Many other configurations of system 10 are possible having more or fewer components than the computer system depicted in FIG. 1.

Implementations discussed hereinafter may include one or more methods implementing various combinations of the functionality disclosed herein. Other implementations may include a non-transitory computer readable storage medium storing instructions executable by a processor to perform a method such as one or more of the methods described herein. Still other implementations may include an apparatus including memory and one or more processors operable to execute instructions, stored in the memory, to perform a method such as one or more of the methods described herein.

Various program code described hereinafter may be identified based upon the application within which it is implemented in a specific implementation. However, it should be appreciated that any particular program nomenclature that follows is used merely for convenience. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that some implementations may not be limited to the specific organization and allocation of program functionality described herein.

Furthermore, it will be appreciated that the various operations described herein that may be performed by any program code, or performed in any routines, workflows, or the like, may be combined, split, reordered, omitted, performed sequentially or in parallel and/or supplemented with other techniques, and therefore, some implementations are not limited to the particular sequences of operations described herein.

Figure 2:
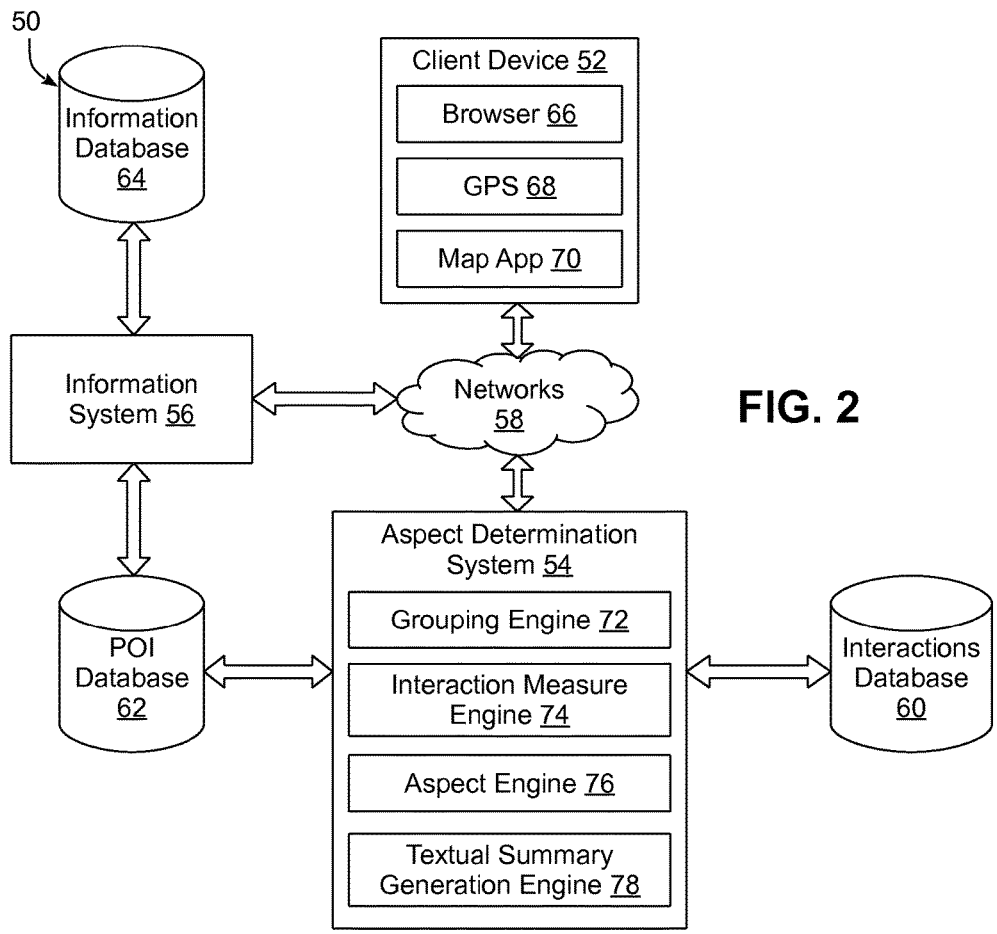
FIG. 2 is a block diagram of an example distributed physical location processing environment.

FIG. 2 illustrates an example environment 50 in which one or more quality visit measures may be determined and used in determining aspects of physical locations (also referred to herein simply as "locations") based on computing interactions (also referred to herein as "interactions") that pertain to and/or are associated with the physical locations. The example environment includes a client device 52, an aspect determination system 54, and an information system 56 interconnected with one another by one or more networks 58. Aspect determination system 54 may be implemented in one or more computers that communicate, for example, through a network (not depicted). Aspect determination system 54 is an example of a system in which the systems, components, and techniques described herein may be implemented and/or with which systems, components, and techniques described herein may interface.

Client device 52, aspect determination system 54, and information system 56 each include one or more memories for storage of data and software applications, one or more processors for accessing data and executing applications, and other components that facilitate communication over a network. The operations performed by aspect determination system 54, and/or information system 56 may be distributed across multiple computer systems.

Client device 52 may be a computer coupled to the aspect determination system 54, the information system 56, and/or other components (e.g., interactions database 60 and/or a component managing interactions database 60) through one or more networks 58 such as a local area network (LAN) or wide area network (WAN) such as the Internet. The client device 52 may be, for example, a desktop computing device, a laptop computing device, a tablet computing device, a mobile phone computing device, a computing device of a vehicle of the individual (e.g., an in-vehicle communications system, an in-vehicle entertainment system, an in-vehicle navigation system), or a wearable apparatus of the individual that includes a computing device (e.g., a watch of the individual having a computing device, glasses of the individual having a computing device). Additional and/or alternative client devices may be provided.

As described herein, in determining aspects of physical locations, aspect determination system 54 may utilize interactions from interactions database 60 that are indicative of computing interactions by individuals that pertain to the physical locations. One or more of the computing interactions may be indicative of activities of individuals via computing devices such as client device 52. For the sake of brevity, only a single client device 52 is illustrated in FIG. 2 and described in some examples herein. However, activities of multiple individuals via multiple client devices may be utilized in determining aspects of physical locations. Moreover, although an individual will likely operate a plurality of computing devices, and aspects of physical locations may be determined based on user actions via multiple of the computing devices, for the sake of brevity, certain examples described in this disclosure will focus on the individual operating client device 52.

Client device 52 may operate one or more applications and/or components such as those that facilitate user selections and/or input that may be indicative of a computing interaction pertaining to a physical location, those that provide location data that may be indicative of a user interaction related to a physical location, and/or those that facilitate provision of search results, suggestions, and/or other information related to physical locations based on output of information system 56. These applications and/or components may include, but are not limited to, a browser 66, a position coordinate component, such as a global positioning system ("GPS") component 68 (other position coordinate technologies such as cellular or Wi-Fi-based triangulation may be used), a mapping application 70 (e.g., to obtain driving directions to or from the location), and so forth. In some instances, one or more of these applications and/or components may be operated on multiple client devices operated by the individual. Other components of client device 52 not depicted in FIG. 2 that may provide indications of interactions of the individual with a physical location may include, but are not limited to, a calendar application (e.g., based on an entry identifying the location), a phone application (e.g., based on a call to or from a number associated with the location), an email application (e.g., based on an e-mailed receipt from the location, e-mailed reservations for the location), a social networking application (e.g., based on a post related to the location, a check-in to the location, a review of the location, a mention of the location), a virtual wallet application (e.g., based on a purchase associated with the location), a search application (e.g., based on searches associated with the physical location), a camera application (e.g., based on a geotag included in photos captured via the camera), and so forth. Some of the aforementioned example components may be standalone components or may optionally be accessed via the browser 66 or another component. It will be appreciated that at least a subset of the interactions will be indicative of an actual visit to a physical location by an individual, e.g., the physical presence of that individual at the physical location.

Interactions database 60 may store records of computing interactions by a plurality of individuals that pertain to physical locations. Generally, a computing interaction of interactions database 60 that pertains to a physical location includes an identifier of that physical location such as an address (e.g., latitude/longitude, street address), an alias, and/or an entity identifier. The computing interaction may optionally include additional information related to the interaction such as, for example, a date of the interaction, time(s) associated with the interaction (e.g., a single time, a time range, and/or time indicative of duration of the interaction), a confidence measure (e.g., based on confidence in the source of the interaction), and so forth. Computing interactions that may be logged in interactions database 60 include, for example, directional queries seeking driving directions to the locations, searches related to the locations, location data from mobile devices, check-ins to the locations, reviews of the locations, calendar entries identifying the locations, media items that include geotags identifying the locations, extracted reservation or receipt information (e.g., extracted from emails) related to the locations, browsing history of the individual related to the locations (e.g., indicating one or more documents accessed by the individual such as webpages), and/or starring or otherwise flagging the locations on a map and/or other interface.

Various components may provide indication of computing interactions for storage in interactions database 60 and a separate component may optionally maintain interactions database 60. Examples of components that may provide interactions for storage in interactions database 60 include, for example, client device 52 and other computing devices of other individuals, information system 56 and other systems, an email system executing on one or more computing devices, navigation systems and/or GPS-enabled devices, and/or one or more other components that may identify interactions with a location. Although only a single interactions database 60 is illustrated, in various implementations interactions database 60 may include multiple databases. For example, a first database may include directional queries related to locations and a second database may include location data from mobile computing devices of individuals that are related to locations. In some implementations, interactions database 60 may include entries of a plurality of individuals and access to entries of an individual in database may be allowed for only the individual and/or one or more other individuals or components authorized by the individual such as aspect determination system 54.

In situations in which the systems described herein collect personal information about individuals, or may make use of personal information, the individuals may be provided with an opportunity to control whether programs or features collect user information (e.g., information about an individual's social network, social actions or activities, profession, an individual's preferences, or an individual's current geographic location), or to control whether and/or how to receive content from the content server that may be more relevant to the individual. Also, certain data may be treated in one or more ways before it is stored or used, so that personal identifiable information is removed. For example, an individual's identity may be treated so that no personal identifiable information can be determined for the individual, or an individual's geographic location may be generalized where geographic location information is obtained (such as to a city, ZIP code, or state level), so that a particular geographic location of an individual cannot be determined. Thus, the individual may have control over how information is collected about the individual and/or used. In addition, in order to obtain the benefit of the techniques described herein, a user may have to install an application and/or invoke a setting on a computing device.

Point of interest ("POI") database 62 may include a collection of entities, and for each of one or more of the entities, a mapping to one or more properties associated with the entity and/or one or more other entities related to the entity. For example, the POI database 62 may be a knowledge graph, such as a local knowledge graph that includes entities associated with businesses and/or other locations and includes properties for each of the entities such as phone numbers, addresses, open hours, most popular hours, etc.

In some implementations, POI database 62 may be utilized to identify one or more locations that are associated with computing interactions of interactions database 60. For example, physical locations identified in POI database 62 may be associated with an address, longitude and latitude, and/or other coordinates that may be utilized to map interactions of interactions database 60 with physical locations. Also, for example, each of one or more physical locations identified in POI database 62 may be associated with one or more aliases for the physical location and/or aliases for properties of the location and those aliases may be utilized to map interactions of interactions database 60 with physical locations.

In various implementations, grouping engine 72 may utilize information from POI database 62 to determine a group of interactions from interactions database 60. For example, grouping engine 72 may identify a point of interest in POI database 62 that is associated with longitude and latitude coordinates and further determine a group of interactions that are associated with those same longitude and latitude coordinates and/or associated with coordinates within a threshold distance of those longitude and latitude coordinates. For instance, grouping engine 72 may identify Restaurant 1 and a latitude and longitude for Restaurant 1 from POI database 62. Grouping engine 72 may further determine a group of interactions that are associated with locations that are within 50 yards of the identified latitude and longitude of Restaurant 1. Also, for example, Restaurant 1 may be associated with a street address in POI database 62 and grouping engine 72 may identify one or more interactions from interactions database 60 that include navigational directions to the street address of Restaurant 1. Also, for example, grouping engine 72 may identify one or more aliases for Restaurant 1 in POI database 62 and determine a group of interactions from interactions database 60 that are associated with the one or more of the aliases (and optionally associated with additional properties such as a location near Restaurant 1 or an alias of a category associated with Restaurant 1).

In this specification, the term "database" will be used broadly to refer to any collection of data. The data of the database does not need to be structured in any particular way, or structured at all, and it can be stored on storage devices in one or more locations. Thus, for example, the databases 60, 62, and/or 64 may each include multiple collections of data, each of which may be organized and accessed differently. Also, for example, all or portions of the databases 60, 62, and/or 64 may be combined into one database and/or may contain pointers and/or other links between entries in the database(s). Also, in this specification, the term "entry" will be used broadly to refer to any mapping of a plurality of associated information items. A single entry need not be present in a single storage device and may include pointers or other indications of information items that may be present on other storage devices. For example, an entry that identifies a computing interaction in interactions database 60 may include multiple nodes mapped to one another, with each node including an identifier of an entity or other information item that may be present in another data structure and/or another storage medium.

Aspect determination system 54 may determine one or more aspects to assign to a location based on computing interactions of individuals that pertain to the location. In various implementations, aspect determination system 54 may include a grouping engine 72, an interaction measure engine 74, an aspect engine 76, and/or a textual summary generation engine 78. In some implementations, one or more of engines 72, 74, 76, and/or 78 may be omitted. In some implementations, all or aspects of one or more of engines 72, 74, 76, and/or 78 may be combined. In some implementations, one or more of engines 72, 74, 76, and/or 78 may be implemented in a component that is separate from aspect determination system 54.

Generally, grouping engine 72 determines groups of computing interactions that are each associated with a physical location. For example, grouping engine 72 may determine a group of computing interactions from interactions database 60 that includes computing interactions of individuals that pertain to a particular physical location such as a business, a landmark, a tourist attraction, or a park. As described herein, the grouping engine 72 may optionally take one or more additional parameters into account in determining a group of user interactions—that are in addition to the group being associated with a physical location. For example, the grouping engine 72 may determine a group of interactions that are associated with one or more physical locations and that are also associated with: one or more dates such as particular dates, particular date ranges, and/or particular day(s) of the week; one or more times such as a single time, a time range, and/or times indicative of durations of the interactions; relative data differences (e.g., when successive visits by an individual are within a particular number of days); a threshold confidence measure (e.g., based on confidence in the source of the interaction); one or more user attributes such as an attribute indicating a particular user group (e.g., local individuals, travelers, etc.); one or more particular sources (e.g., only location data, only driving directions); relationships between individuals (e.g., to detect joint visits by multiple individuals, including multiple individuals that are connected via social media); and so forth.

For example, grouping engine 72 may determine a group of interactions of individuals at a location at one or more time periods (e.g., interactions of individuals at Restaurant 1 between 11 am and 1 pm). Also, for example, grouping engine 72 may determine a group of interactions that includes interactions of individuals at multiple locations of a particular business (e.g., interactions of individuals with various locations of a restaurant chain). Which parameters are utilized by grouping engine 72 in determining one or more groups of interactions may be based at least in part on the desired aspect to be determined about a location. Examples are provided herein of example aspects that may be determined for a location and parameters that may optionally be taken into account in determining one or more groups of interactions for utilization in determining the example aspects.

In some implementations of determining a group, grouping engine 72 may determine that one or more interactions are outliers and not include the interactions in the group. Outlying interactions may be identified and removed from groups based on one or more techniques, such as truncated means and/or Winsorized means, and/or interactions that are below a threshold duration and/or above a threshold duration may be discarded. For example, grouping engine 72 may not include interactions that are associated with a duration of visit that is greater than a threshold as they may be indicative of interactions of employees instead of customers. Also, for example, grouping engine 72 may identify opening hours and/or closing hours of a location and determine that interactions from individuals that are present before opening time and/or after closing time are likely employees. Also, for example, in some implementations one or more interactions may be associated with a confidence level and only interactions that satisfy a threshold confidence level may be included by grouping engine 72 in a group of interactions. For example, an interaction that indicates multiple potential locations may be associated with a low confidence level if an exact location may not be accurately determined (e.g., the interaction may be based on inaccurate location data that indicates an area that encompasses multiple points of interest).

In some implementations, grouping engine 72 may determine a group of interactions indicative of joint visits by multiple individuals, e.g., when multiple individuals visit a location as a single party (e.g., a group of friends having dinner together at a restaurant). As such, grouping engine 72 may access a social media account for an individual to and attempt to identify overlapping visits by his or her friends within the same time frame. In some implementations, joint visits may be indicated by similar arrival and departure times, e.g., to exclude instances where friends just happen to be at the same location but are part of a different party. Visits that are representative of joint visits may be specifically marked or linked by grouping engine in some implementations and may include indications of the individuals participating in those joint visits. In other implementations, determinations of joint visits, including accesses to social media accounts to identify an individual's friends, may be performed in other components, e.g., within interaction measure engine 74.

Interaction measure engine 74 may determine one or more computing interaction measures based on the one or more groups of computing interactions determined by grouping engine 72. For example, grouping engine 72 may determine a group of interactions that includes computing interactions by that pertain to a location and interaction measure engine 74 may determine one or more measures therefrom. Among other measures, interaction measure engine 74 may determine one or more measures indicative of "quality" visits by one or more individuals, herein referred to as quality visit measures. For example, grouping engine 72 may determine a group of interactions of one or more individuals with Restaurant 1 and interaction measure engine 74 may determine a quality visit measure such as a repeat visit measure that is generally indicative of how many individuals visit Restaurant 1 on a repeat and/or regular basis. For such a measure, the fact that a particular individual tends to patronize the restaurant on a regular basis, or at least is willing to return after a prior visit, may be considered to be an indication that the individual has an overall positive opinion of the restaurant, and thus an indication of the popularity or quality of the restaurant. Furthermore, the collective incidence of repeat and/or regular visits by multiple individuals may be considered to be an even greater indication of the popularity or quality of the restaurant.

Another type of quality visit measure that may be determined by interaction measure engine 74 is a "brought a friend" visit measure, which, as noted above, is based upon the fact that an individual who has visited a location once and then later returned with a friend may be considered to be indicative of the individual liking the location. Yet another type of quality visit measure that may be determined by interaction measure engine 74 is a "recommended" visit measure, which, as noted above, is based on the fact that an individual who has received a recommendation for a location from a friend and later visited the location may be considered to be indicative of the friend liking the location.

Other types of quality visit measures may also be determined by interaction measure engine 74, as will be appreciated by those of ordinary skill having the benefit of the instant disclosure.

In addition, in some implementations, interaction measure engine 74 may determine additional measures that may be combined with and/or utilized separately of a quality visit measure. For example, in some implementations, interaction measure engine 74 may determine measures that are indicative of durations of interactions of the individuals indicated by a group of interactions. In some implementations, the measures may include an average or median duration of visits (e.g., as indicated by a length of time an individual's GPS reading remains within a particular radius, or the time between an ingress and egress GPS reading). In some implementations, the measures may additionally or alternatively include a continuous or discrete distribution of durations of visits, e.g., a mean with a standard deviation, a vector including all lengths of visits or a count of lengths of visits for one or more durations (e.g., a count of durations from 0-5 minutes, a count of durations from 5-10 minutes, etc.), and so forth. Also, for example, interaction measure engine 74 may determine, based on a group of interactions for a location, one or more measures indicative of a quantity of visits of individuals to the location. For instance, the measures may include one or more of a raw count of the interactions of the group, an average and/or median count per day or other time period, and/or a continuous or discrete distribution of quantity of interactions (e.g., a mean with a standard deviation, a vector including raw counts or averages for each of a plurality of time periods (e.g., a count of interactions each day for the past two weeks; a count of interactions during a first time period, a second time period, etc.)). Which measures are determined by interaction measure engine 74 may be based at least in part on the desired aspect to be determined about a location. Examples are provided herein of example aspects that may be determined for a location and one or more measures that may optionally be taken into account in determining the example aspects.

Aspect engine 76 may determine an aspect of a location based on the one or more interaction measures determined by interaction measure engine 74, and may assign the aspect to the location. For example, the aspect engine 76 may associate the aspect with the location in POI database 62. As one example of determining an aspect, interaction measure engine 74 may determine a quality visit measure that indicates whether a restaurant has many regular or repeat customers, and aspect engine 76 may compare that quality visit measure to a second measure such as a threshold to determine whether the restaurant location has enough such customers so as to be characterized as being "frequented by regulars." As another example, interaction measure engine 74 may determine a quality visit measure that indicates whether a restaurant has many visits tied to prior visits by friends and/or recommendations by friends, and aspect engine 76 may compare that quality visit measure to a second measure such as a threshold to determine whether the restaurant location has enough such customers so as to be characterized as being "frequently recommended by friends."

Aspect engine 76 may also determine additional aspects of a location based upon interaction measures, e.g., for a restaurant, aspects such as "fast food" or "sit down," "trending up" or "trending down," "breakfast/lunch/dinner spot,"

"weekday spot" or "weekend spot," "most popular Italian restaurant in the neighborhood," etc.

Textual summary generation engine 78 may be configured to automatically generate one or more textual summaries about a physical location based on signals provided by various components, such as interaction measure engine 74 and/or aspect engine 76. For example, in some implementations, textual summary generation engine 78 may be configured to automatically generate a textual description of a physical location based on comparison of two or more interaction measures. This comparison may be the same comparison that yields one or more aspects that are assigned to the physical location, and in fact, in some implementations, textual summary generation engine 78 may additionally or alternatively automatically generate a textual description of a physical location based on one or more aspects assigned to the physical location. Textual summaries may fall into various categories, including textual summaries that describe a physical location in comparison to a "peer group" of similar locations (the peer group may include the location itself, too), and textual summaries that describe absolute characteristics of a physical location.

Textual summaries that compare a physical location to a peer group may include textual summaries that compare the physical location to other physical locations that satisfy one or more criteria. For example, the textual summary "neighborhood bar most frequented by locals in the East Village" compares the physical location (a bar in the East Village) to a peer group of bars in the East Village and relies in part on a quality visit measure to assess how many individuals who are local to the area are repeat customers of that location.

Likewise, the textual summary "most searched for Indian restaurant in Silicon Valley" compares the physical location (an Indian restaurant in Silicon Valley) to a peer group of Indian restaurants in Silicon Valley. "The most popular bakery in Deer Park" compares the physical location (a bakery in Deer Park) to a peer group of bakeries in Deer Park. "The cheapest French restaurant with a full bar in Queens" compares the physical location (a French restaurant in Queens) to a peer group of French restaurants in Queens that have full bars.

The peer group to which a physical location is compared may be selected based on one or more criteria. These criteria may include but are not limited to being located within a particular geographic area, being of a particular category (e.g., Indian restaurant, Italian restaurant, Mexican restaurant, bar, bakery, coffee shop, etc.), selling goods/services within a particular price range, having one or more characteristics (repeat customers, visits by friends, quiet ambiance, outdoor seating, full bar, waterfront view, live music, etc.), and so forth.

The one or more criteria for including physical locations in a peer group may be selected, e.g., by grouping engine 72, based on various signals. These signals may come from various sources, such as client device 52 (directly or indirectly), or from information system 56. One such signal is a particular location of potential interest for an individual. If the individual indicates (explicitly or implicitly) potential interest in booking a room at a particular fancy hotel, then criteria for selecting a peer group of hotels may include hotels having a similar price range as the particular hotel, or other hotels that best match the individual's particular preferences (e.g., hotels having particular number of stars, hotels with gyms, etc.).

Another signal for selecting the one or more criteria for including physical locations in a peer group may additionally or alternatively be contextual data associated with an individual (as opposed to the individual's computing device). Suppose an online calendar entry associated with an individual indicates that the individual is scheduled to be in a particular geographical area soon after lunch. Suppose further that the individual uses her phone to search for "quick lunch spots." Grouping engine 72 may select, e.g., from interactions database 60, interactions that pertain to locations at or near that geographic location that are known to provide relatively fast lunch options. Other user-related contextual data that may be used to determine criteria for selecting a peer group of physical locations may include user preferences, user budget, user social network status updates, and so forth.

Another signal for selecting the one or more criteria for including physical locations in a peer group may additionally or alternatively be non-user related information such as a population or size of a geographic area. For example, suppose the individual is located in Hollywood and searches for "Indian food." A textual summary describing a particular search result as "the best Indian restaurant in California" would not be as useful as, for example, "the best Indian restaurant in Los Angeles." Thus, a size and/or population of a geographic area associated with an individual's location may be used, e.g., by grouping engine 72, to determine criteria for selecting interactions from interactions database 60. In some implementations, if a particular physical location is unique within a geographic area (or more generally, the sole member of a particular peer group), a special textual summary may be generated, e.g., by textual summary generation engine 78, such as "the only bourbon bar in St. Matthews."

Another categories of textual summaries includes textual summaries that describe a physical location in its own, absolute terms, rather than in comparison to a peer group of other physical locations. Computing interactions that pertain to a physical location may be analyzed, for instance, in terms of different time periods (e.g., lunch hours versus dinner hours), as described above. Examples of absolute summaries include but are not limited to "a significant number of visitors come revisit this location," "this place is getting busier," "this spot is more popular for brunch than for dinner," and so forth. In various implementations, such textual summaries may be generated, for instance, by textual summary generation engine 78 based on one or more aspects assigned to a physical location by aspect engine 76.

Generally, information system 56 utilizes interaction measures and/or aspects that have been determined by aspect determination system 54, and/or textual summaries generated by textual summary generation engine 78, in providing information to a user, e.g., by generating a computer response to a query generated by that individual. The information system 56 may utilize the aspects and/or textual summaries, for example, in determining the information to provide (e.g., the aspects may be included in the information) and/or determining when or how to provide the information (e.g., the interaction measures and/or aspects may be utilized to select the information and/or to rank the information relative to other information). For example, information system 56 may identify individual interest in one or more locations and provide information related to the one or more locations based on determined aspects of the locations. Further, interaction measures such as quality visit measures may be used to increase the relative ranking of locations that are associated with repeat visits and/or visits associated with prior recommendations or visits.

In some implementations, textual summary generation engine 78 may be integral with information system 56 instead of with aspect determination system 54. In other implementations, textual summary generation engine 78 may be a standalone component independent from aspect determination system 54 and information system 56.

Information system 56 may be, for example, a search engine, a notification and/or suggestion system, and/or one or more other systems that may provide information related to locations to a computing device of an individual based on implicit and/or explicit indications from the computing device (e.g., based on a query from the computing device, a selection of an individual via the computing device, based on access of an application via the computing device such as access of a suggestion system). Information system 56 may optionally be in communication with information database 64. Information database 64 may include information that may be utilized by information system 56 to provide information to the individual. For example, information database 64 may include an index of documents, webpages, and/or other information items that may be utilized to identify information to provide to the individual. As one example, information system 56 may be a search engine and the information database 64 may be a search index utilized to identify documents responsive to search queries. As described herein, such documents may optionally be ranked for search queries based on determined aspects that are associated with the documents. In some implementations, information system 56 and/or another component may optionally update information database 64 based on interaction measures determined by interaction measure engine 74, aspects determined by aspect engine 76 and/or textual summaries generated by textual summary generation engine 78. For example, when information database 64 is an index of webpages and other documents, the index may be updated to include information related to interaction measures and/or aspects determined herein (e.g., a webpage associated with a location may be indexed based on determined aspects of that location).

In some implementations, information system 56 may select and/or rank search results responsive to a submitted search query based on determined interaction measures and/or aspects. For example, an individual may provide a search query of "neighborhood bars" and information system 56 may identify information in information database 64 related to one or more nearby locations that are bars. Based on inclusion of "neighborhood" in the search query, the information system 56 may further identify that one or more of the identified locations are associated with determined aspects that are indicative of being frequented by regulars. The information system 56 may select such identified locations for providing in response to the search query and/or promote the ranking of such locations in search results provided in response to the search query, e.g., based upon a quality visit measure.

In some implementations, one or more search results may be selected and/or ranked based on determined interaction measures and/or aspects, even when terms of a query do not indicate interest in the determined interaction measures and/or aspects. For example, the individual may provide a search query of "Italian restaurants" and information system 56 may identify one or more webpages responsive to the query via information database 64. Information system 56 may identify one or more nearby locations in POI database 62 that are associated with the webpages. Based at least in part on a quality visit measure such as a repeat visit measure, any nearby locations that are found to have high incidences of repeat customers may be promoted and displayed higher in the search results. In some implementations, ranking signals based upon quality visit measures may be combined with other ranking signals, e.g., based upon user reviews, popularity on the web, and other potential indicators of quality or popularity of such locations.

In some implementations, information system 56 may provide information related to a location independent of any query submission of an individual. For example, information system 56 may be a notification or suggestion system that may provide information related to popular locations without the individual submitting a query related to a location. For instance, the information may be "pushed" to the individual and/or provided in response to the individual accessing the suggestion system or selecting an interface element in the suggestion system. Also, for example, information system 56 may provide one or more suggestions responsive to a selection of the individual that is not the individual explicitly typing, speaking, or otherwise inputting a query. For instance, the individual may select a user interface element to request "popular restaurants" nearby and information system 56 may select information related to one or more restaurants based on determined aspects that indicate the restaurants are "popular". Also, for example, information system 56 may be a mapping application that may provide a map with various points of interest for display on a computing device of an individual. Information system 56 may determine to include one or more of the points of interest based on association of the points of interest to one or more determined aspects and/or may determine to display one or more of the points of interest more prominently and/or with additional descriptions based on association of the points of interest to one or more determined aspects and/or based on associated textual summaries generated by textual summary generation engine 78. As such, a computer response to a query in some implementations may refer to a query made internally within an information system or made by another system, and not specifically generated by an individual.

Also, in some implementations, interaction measures such as quality visit measures may be used in structural searches, e.g., by providing checkboxes in advanced searches so that users may elect to search only for frequently revisited locations. In some implementations, interaction measures such as quality visit measures may also be displayed to users, as well as to owners or other parties affiliated with the locations, e.g., to enable an owner to see what percentage of his or her customers was repeat customers and/or how frequently a typical customer returned to the location.

Figure 3:
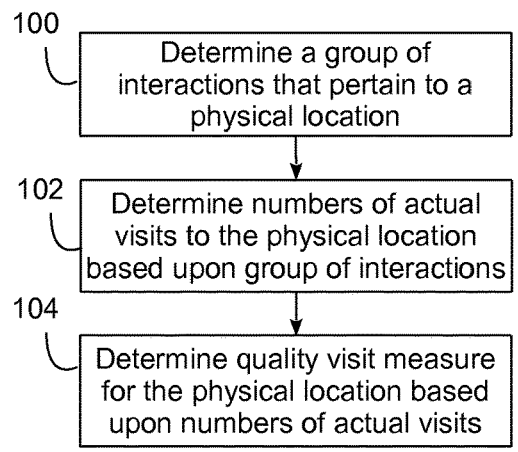
FIG. 3 is a flowchart illustrating an example method of determining a quality visit measure using the environment of FIG. 2.

Now turning to FIG. 3, this figure is a flowchart illustrating an example method of determining a quality visit measure. For convenience, the operations of the flowchart are described with reference to a system that performs the operations. This system may include various components of various computer systems. For instance, some operations may be performed by one or more components of the aspect determination system 54, such as grouping engine 72 and interaction measure engine 74. Moreover, while operations of the method of FIG. 3 are shown in a particular order, this is not meant to be limiting. One or more operations may be reordered, omitted or added.

The flowchart may be used, for example, to determine a quality visit measure for a single physical location. The flowchart begins in block 100 by determining a group of interactions that pertain to a particular physical location, e.g., using grouping engine 72 to determine those interactions in interactions database 60 that are pertinent to the physical location in question. In some implementations, a group of interactions may be determined that includes interactions of individuals based on one or more characteristics of the individuals, e.g., to restrict the interactions based on an individual characteristic criterion. For example, grouping engine 72 may determine a group of interactions that are associated with certain user attributes and/or certain user groups. In some implementations, grouping engine 72 may determine a group of interactions that occurred during a time period, e.g., to restrict the interactions based on a temporal criterion. For example, grouping engine 72 may determine a group of interactions that occurred during a particular week, month, day of the week, and/or during a particular time of day over a period of time (e.g., interactions during lunchtime over the last month). The interactions, as noted above, may include various types of interactions that are associated with actual visits to the physical location by one or more individuals, and as such, in block 102 the number of actual visits to the physical location by each of one or more individuals may be determined based upon the group of interactions pertaining the physical location, e.g., using the interaction measure engine 74. In some implementations, for example, the group of interactions may be used to determine that individual A visited the location 10 times, individual B visited the location 1 time, and individual C did not visit the location. Next, in block 104 interaction measure engine determines a quality visit measure for the location based upon the determined numbers of actual visits by each of the one or more individuals, and the flowchart is complete.

Figure 4:
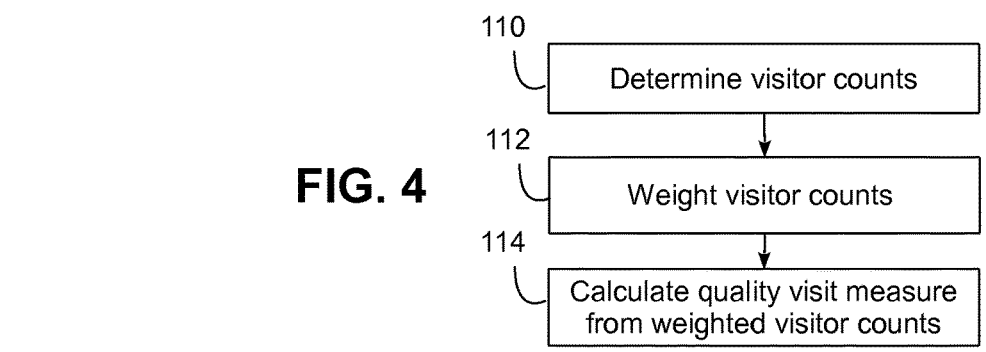
FIG. 4 is a flowchart illustrating an example method of determining a quality visit measure from the actual visits determined in the flowchart of FIG. 3.

It will be appreciated that a quality visit measure may be determined by interaction measure engine 74 in block 110 in a number of manners in different implementations. As shown in the flowchart of FIG. 4, for example, visitor counts may be determined (block 110) from the actual visits determined in block 102. A visitor count, in this regard, may be considered to include the number of individuals that have visited a physical location a predetermined number of times. Thus, for example, one visitor count may be associated with one visit, and may include a count of the number of visitors who have visited the location one time. Another visitor count may be associated with five visits, and may include a count of the number of visitors who have visited the location five times. Next, in block 112, the visitor counts may be weighted, e.g., to emphasize visitor counts associated with higher numbers of visits over visitor counts associated with lower numbers of visits, and in block 114, the weighted visitor counts may be used to calculate the quality visit measure. The flowchart of FIG. 4 is then complete.

In some implementations, the quality visit measure may be based upon a formula that is based upon the accumulated visitor counts, e.g. as illustrated by equation (1) below:

$$\frac{\sum_{i=1}^{N}(w_i C_i)}{C_0 + \sum_{i=1}^{N} C_i} \quad (1)$$

where $C_i$ is a visitor count equal to the number of individuals having visited the physical location i times, $w_i$ is the weight applied to visitor count $C_i$, and $C_0$ is an offset that is used to deemphasize physical locations lacking sufficient visits by individuals to make a meaningful assessment. In some implementations, the weights $w_i$ may be determined empirically, e.g., by tuning experimentally to match the responses of local recommendation engines. Further, generally the weights may be selected to emphasize greater numbers of visits by individuals, such that individuals visiting only once are strongly deemphasized (e.g., close to 0) whereas individuals visiting numerous times are strongly emphasized (e.g., close to 1). Other implementations may rely on different formulas and/or calculations, however, and as such, the formula discussed herein is not the exclusive manner in which a quality visit measure may be calculated.

Figure 5:
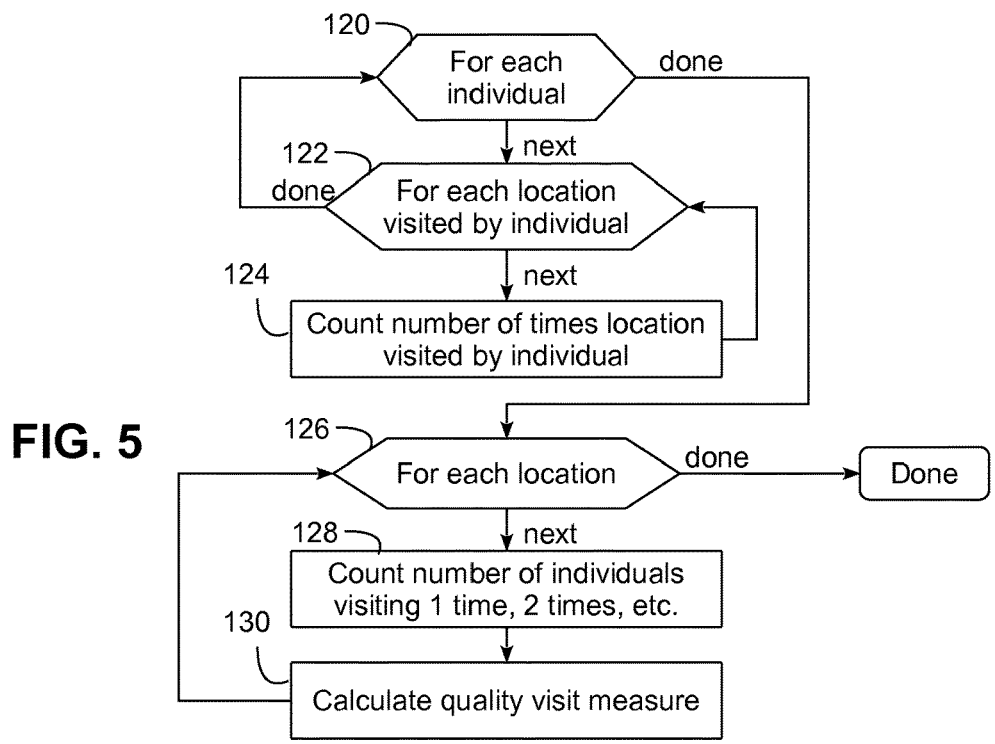
FIG. 5 is a flowchart illustrating another example method of determining a quality visit measure using the environment of FIG. 2.

Next, turning to the flowchart of FIG. 5, it may be desirable in some implementations to process multiple locations collectively in order to determine quality visit measures for a set of physical locations, e.g., within program code executing in interaction measure engine 74. Nested FOR loops may be initiated in blocks 120 and 122, for example, to process each individual among a group of individuals and each physical location visited by each individual in the group. For each such individual/visited location, block 124 may list the location and record the number of times the individual visited that location. Block 124 is repeated for every visited location for the current individual, and once all visited locations have been processed, block 122 returns control to block 120 to process the next individual and the locations visited thereby. Once all individuals have been processed, block 120 then passes control to block 126 to initiate a FOR loop that processes each location. For each location, block 128 generates visitor counts by counting the number of individuals that have visited the location one time, two times, three times, etc. Then, in block 130, the quality visit measure for that location is calculated, e.g., using equation (1) above.

The quality visit measure calculated above in FIGS. 3-5 incorporates a repeat visit measure, indicative of the number and/or frequency of repeat visits by individuals. As noted above, however, other types of measures (e.g., "brought a friend" visit measures and/or "recommended" visit measures) may be utilized as quality visit measures, and in some implementations, multiple quality visit measures may be combined. For example, in some implementations, an overall quality visit measure may be determined by weighting each of a repeat visit measure, a "brought a friend" visit measure and a "recommended" visit measure and summing or averaging the weighted values.

Figure 6:
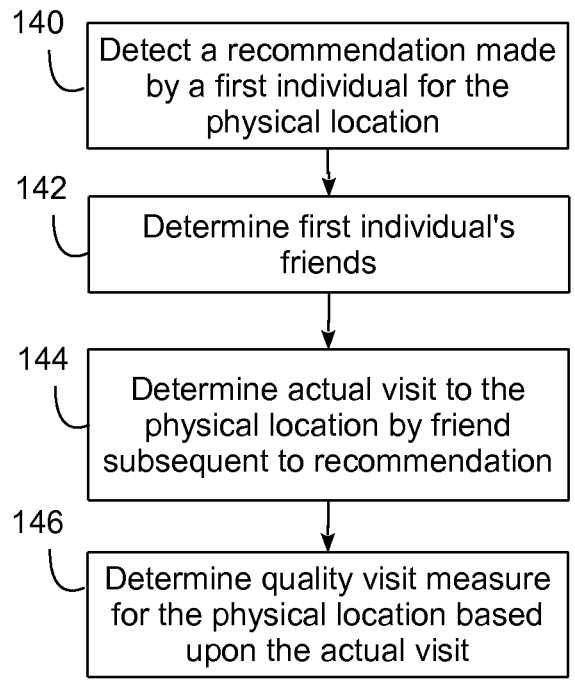
FIG. 6 is a flowchart illustrating an example method of determining a "recommended" visit measure using the environment of FIG. 2.

FIG. 6, for example, is a flowchart illustrating an example method of determining a "recommended" visit measure. In this flowchart, it is assumed that interaction measure engine 74 additionally has access to social media information about each individual, in particular any postings by an individual to various social media sites, as well as any other individuals identified as "friends" of that individual. The flowchart begins in block 140 by detecting a recommendation made by a first individual for a physical location, e.g., via social media, via email, via text message. Detection may include, for example, performing text analysis to detect a physical location, identifying the physical location through a check-in or other location information associated with a social media posting, etc. In addition, text analysis may be used to determine if the content of the posting is positive in nature or otherwise indicative of a recommendation, e.g., a posting that states "Best fried chicken I've ever had!" and that is tagged with the location of a Restaurant A, or an email or text to another individual stating "You really need to try Restaurant A!"

Next, in block 142 the first individual's list of friends is accessed, and in block 144 each of the individuals determined to be friends of the first individual are processed to determine if any actual visits were made to the physical location by any friend subsequent to the recommendation.

Then, in block 146 a quality visit measure is determined, e.g., a "recommended" visit measure or a quality visit measure based at least in part on such a measure. In some implementations, for example, the number of actual visits by friends subsequent to an individual making a recommendation may be accumulated and weighted. The determination of the quality visit measure is then complete.

Figure 7:
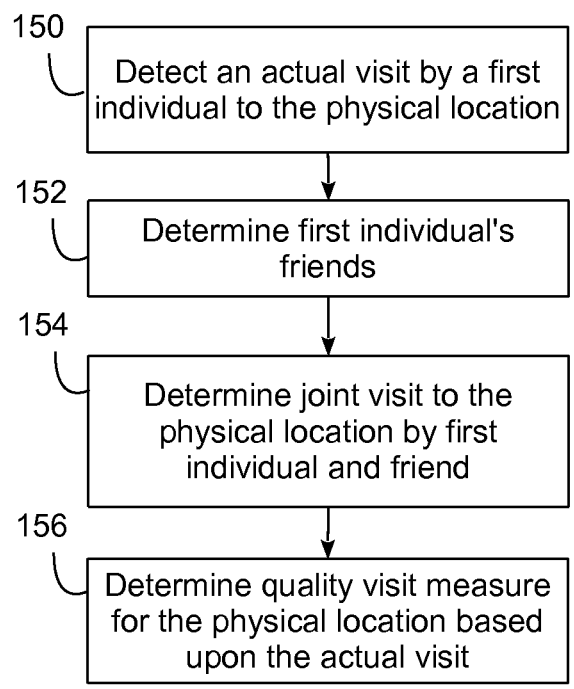
FIG. 7 is a flowchart of an example method of determining a "brought a friend" visit measure using the environment of FIG. 2.

FIG. 7 is a flowchart illustrating an example method of determining a "brought a friend" visit measure. In this flowchart, it is also assumed that interaction measure engine 74 additionally has access to social media information about each individual, in particular any other individuals identified as "friends" of that individual. The flowchart begins in block 150 by detecting an actual visit made by a first individual to a physical location. Next, in block 152 the first individual's list of friends is accessed, and in block 154 each of the individuals determined to be friends of the first individual are processed to determine if any joint visits were made to the physical location by any friend subsequent to the recommendation, i.e., to determine whether the first individual and the friend visited the location together. Then, in block 156 a quality visit measure is determined, e.g., a "brought a friend" visit measure or a quality visit measure based at least in part on such a measure. In some implementations, for example, the number of joint visits by friends with the first individual subsequent to an individual making the first visit may be accumulated and weighted. The determination of the quality visit measure is then complete.

Figure 8:
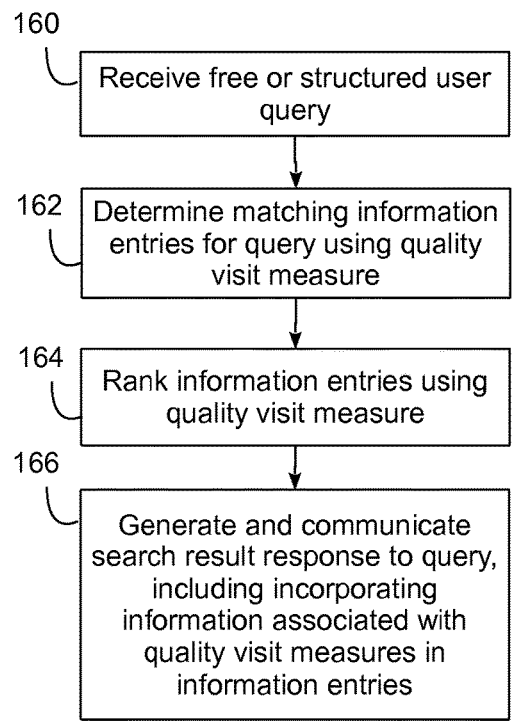
FIG. 8 is a flowchart of an example method of processing a query and controlling a computer response thereto using the environment of FIG. 2.

Now turning to FIG. 8, this figure is a flowchart illustrating an example method of processing a query and controlling a computer response thereto, which illustrates one manner in which a quality visit measure may be used to improve computer processing of queries. The flowchart begins in block 160 by receiving a free or structured query from a user. A free query, for example, may include a list of keywords or a natural language input and may or may not include any specific request from a user regarding repeat visits. A structured query, on the other hand, may include user controls such as text boxes, check boxes, etc., through which a user may generate a query with generally greater specificity, including requests regarding repeat visits. As noted above, for example, a structured query may be used in some implementations to specifically request to receive only results that match a particular visit quality criterion, e.g., to show only results that have a number and/or frequency of repeat visits above a particular threshold. In addition, in some instances, a query may be directed specifically to information about a particular physical location, while in other instances, a query may be directed to multiple physical locations matching some other criterion.

Next, block 162 determines one or more matching information entries for the received query using the quality visit measure associated with various physical locations, and block 164 then ranks the matching information entries using the quality visit measure. Thus, for example, in some implementations, if a user specifies a particular visit quality criterion, block 162 may include or exclude information entries for particular physical locations based upon quality visit measures for those locations. In addition, in some implementations, block 164 may rank information entries based upon quality visit measures for associated physical locations, e.g., to promote physical locations having higher quality visit measures. It will be appreciated that in other implementations, a quality visit measure may be used only to determine matching information entries, or only to rank matching information entries.

Next, block 166 generates and communicates a search result response to the query, e.g., including one or more information entries matching the query. In some implementations, additional information associated with a quality visit measure may also be incorporated into some or all of the information entries, e.g., as generated by textual summary generation engine 78. For example, in some implementations, if a physical location is found to have a relatively high quality visit measure, an indication such as "lots of repeat customers" may be included with an information entry. In other implementations, however, no additional information may be included. It will be appreciated that once communicated, the search result response may be received and/or consumed by a user device, e.g., client device 52. In some implementations, for example, some or all of the search result response may be rendered on a client device and displayed to a user. Processing of the query is then complete.

Figure 9:
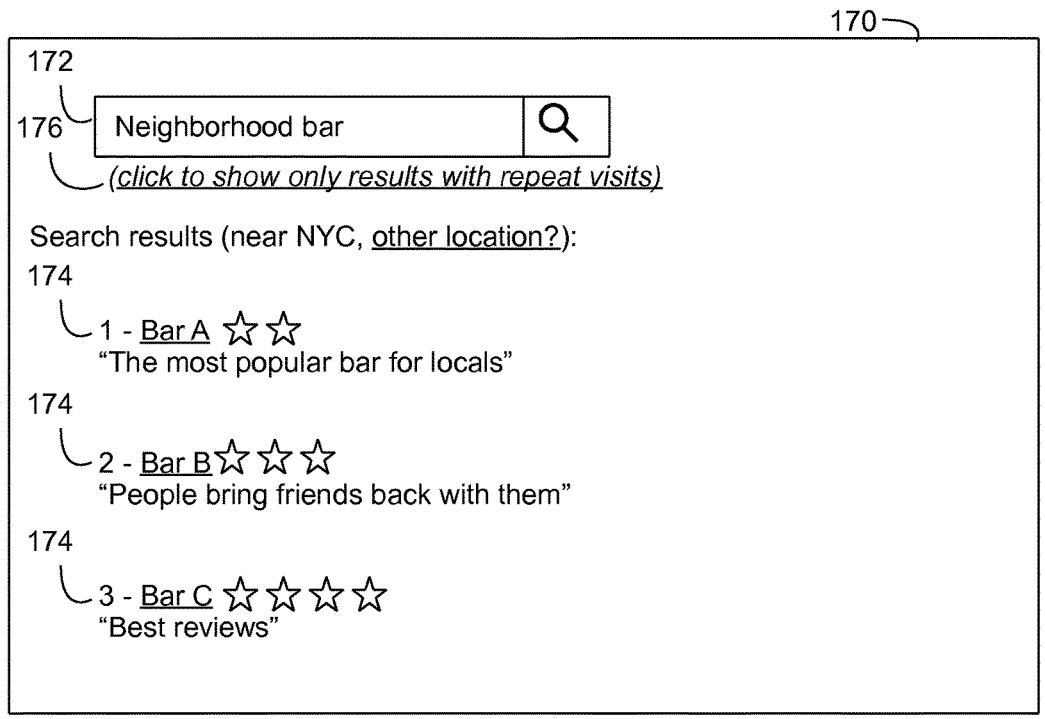
FIG. 9 is a display of an example output generated by the flowchart of FIG. 8.

It will be appreciated that a wide variety of queries may be processed and/or a wide variety of responses may be generated using a quality visit measure in various implementations. FIG. 9, for example, illustrates a computer display 170 that may be generated, rendered and/or displayed in response to a query, e.g., on a client device, and that illustrates various features described herein. Display 170 includes a search box 172 illustrating an example query for "neighborhood bar," along with displays for a number of information entries 174 representing the search results generated in response to the query. In this example, it is assumed that the location of the client device has been provided along with the query such that bars close to the current location of the client device will be returned (here, New York City). An option may also be provided to specify another location, as shown in FIG. 9. Also, in this example it is assumed that the search for a "neighborhood bar" implies that the user is interested in an establishment that serves mostly regular customers, and as such, a quality visit measure may be used at least to emphasize search results related to bars for which greater numbers of repeat visits are detected.

The displayed search results include three information entries 174 for a Bar A, Bar B and Bar C. Each bar has a rating based upon 1-4 stars, and it may be seen that Bar A and Bar B, while being lower rated (e.g., based upon user-submitted reviews), are ranked ahead of Bar C, because each of Bar A and Bar B has been found to have higher quality visit measures than Bar C. Also illustrated is additional information for each of Bar A and Bar B based upon a quality visit measure associated with each bar. For Bar A, for example, the information entry states "the most popular bar for locals," indicating that Bar A is determined to have the greatest number of customers with the greatest number of repeat visits each, and moreover, that the customers that are assessed in this determination are limited to those having a home address nearby. For Bar B, the information entry states "people bring friends back with them" to indicate that a relatively high "brought a friend" visit measure has been determined for Bar B. For Bar C, the information entry states "best reviews," indicating that Bar C has more and/or better reviews, but given the lack of information regarding repeat visits or other quality visits, Bar C is deemphasized in the response.

In addition, as discussed above, in some instances a query may specify a quality visit criterion that limits results to those locations for which a quality visit measure meets a particular criterion. A link 176, for example, illustrates a selectable user control that may be activated as part of a structured query to limit search results to physical locations matching a quality visit criterion. Selection of link 176, for example, may omit Bar C from updated search results generated in response to the selection.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer implemented method, comprising:
   determining, by one or more processors, a group of computing interactions by one or more individuals pertaining to a physical location, wherein the group of computing interactions by the one or more individuals is indicative of one or more positive social media interactions associated with a friend and an actual visit to the physical location by the one or more individuals;
   determining, by the one or more processors, based at least in part on the determined group of computing interactions and one or more criteria, a number of the one or more positive social media interactions associated with a friend and actual visits to the physical location by each of the one or more individuals, wherein the one or more criteria comprise a duration of each of the one or more individuals at the physical location exceeding a minimum duration, and wherein the duration of each of the individuals at the physical location is based at least in part on signals associated with the group of computing interactions and indicative of the one or more individuals being within a particular radius of the physical location;
   determining, by the one or more processors, a quality visit measure for the physical location based at least in part on the determined number of the one or more positive social media interactions associated with a friend and the actual visits to the physical location by each of the one or more individuals, including weighting the quality visit measure to emphasize greater numbers of the one or more positive social media interactions associated with a friend and repeat visits by an individual among the one or more individuals; and
   controlling, by the one or more processors, a computer response to a query associated with the physical location using the determined quality visit measure.

2. The method of claim 1, further comprising determining from the determined number of actual visits to the physical location a plurality of visitor counts, each of the plurality of visitor counts associated with a predetermined number of actual visits and equal to a number of individuals among the one or more individuals determined to have the predetermined number of actual visits to the physical location, wherein weighting the quality visit measure includes weighting the quality visit measure based upon the plurality of visitor counts.

3. The method of claim 2, wherein weighting the quality visit measure based upon the plurality of visitor counts includes applying a different weight to each of the plurality of visitor counts.

4. The method of claim 3, wherein determining the quality visit measure comprises determining the quality visit measure based upon a function of $C_i$, $w_i$, $C_O$ and N, where $C_i$ is the visitor count equal to the number of individuals among the one or more individuals having visited the physical location i times, $w_i$ is the weight applied to visitor count $C_i$, $C_O$ is an offset that deemphasizes the quality visit measure for the physical location in response to a dearth of determined computing interactions for the physical location, and N is the number of visitor counts for the physical location.

5. The method of claim 4, wherein weights $w_1 \ldots w_N$ increase from $w_1$ to $w_N$ to emphasize when an individual among the one or more individuals visits the physical location many times.

6. The method of claim 1, further comprising restricting the group of computing interactions to computing interactions of individuals matching an individual characteristic criterion.

7. The method of claim 1, further comprising restricting the group of computing interactions to computing interactions associated with actual visits matching a temporal criterion.

8. The method of claim 1, further comprising:
   detecting a recommendation of the physical location made by a first individual; and
   determining from the determined group of computing interactions an actual visit made to the physical location by a second individual after the recommendation made by the first individual;
   wherein determining the quality visit measure for the physical location is further based at least in part on the determined actual visit made to the physical location by the second individual after the recommendation made by the first individual.

9. The method of claim 1, further comprising:
   determining from the determined group of computing interactions a first actual visit made to the physical location by a first individual; and
   determining from the determined group of computing interactions a second actual visit made to the physical location by a second individual that is a friend of the first individual;
   wherein determining the quality visit measure for the physical location is further based at least in part on the second actual visit being made to the physical location by the second individual after the first actual visit made by the first individual.

10. The method of claim 9, further comprising determining from the determined group of computing interactions that the second individual visited the physical location with the first individual, wherein determining the quality visit measure for the physical location is further based at least in part on the second actual visit being made to the physical location by the second individual with the first individual after the first actual visit made by the first individual.

11. The method of claim 1, wherein each computing interaction is determined based upon a location of a computing device of an individual, a navigation request made by an individual, a check-in by an individual, or geotag data of an electronic file of an individual.

12. The method of claim 1, wherein the physical location is associated with a point of interest, wherein the query is a user-generated query for points of interest within a geographical area or for points of interest of a category, and wherein controlling the computer response to the query associated with the physical location using the determined quality visit measure includes:
ranking an information entry associated with the physical location relative to other information entries associated with other physical locations matching the query based at least in part on the determined quality visit measure; and
generating a search result response to the query including the information entry associated with the physical location.

13. The method of claim 12, wherein generating the search result response includes including with the information entry additional information associated with the determined quality visit measure.

14. The method of claim 1, wherein the physical location is associated with a point of interest, wherein the query is a user-generated structured query for points of interest matching a visit quality criterion, and wherein controlling the computer response to the query associated with the physical location using the determined quality visit measure includes including an information entry associated with the physical location in a search result response based at least in part based upon the determined quality visit measure meeting the visit quality criterion.

15. The method of claim 1, wherein the query is a query for information about the physical location, and wherein controlling the computer response to the query associated with the physical location using the determined quality visit measure includes including information associated with the determined quality visit measure with an information entry associated with the physical location in a search result response.

16. A system, comprising:
memory storing instructions; and
one or more processors operable to execute the instructions in the memory, wherein the instructions comprise instructions to:
determine a group of computing interactions by one or more individuals pertaining to a physical location, wherein the group of computing interactions by the one or more individuals is indicative of one or more positive social media interactions associated with a friend and an actual visit to the physical location by the one or more individuals;
determine based at least in part on the determined group of computing interactions and one or more criteria, a number of the one or more positive social media interactions associated with a friend and actual visits to the physical location by each of the one or more individuals, wherein the one or more criteria comprise a duration of each of the one or more individuals at the physical location exceeding a minimum duration, and wherein the duration of each of the individuals at the physical location is based at least in part on signals data associated with the group of computing interactions and indicative of the one or more individuals being within a particular radius of the physical location;
determine a quality visit measure for the physical location based at least in part on the determined number of the one or more positive social media interactions associated with a friend and the actual visits to the physical location by each of the one or more individuals, including weighting the quality visit measure to emphasize greater numbers the one or more positive social media interactions with a friend and of repeat visits by an individual among the one or more individuals; and
control a computer response to a query associated with the physical location using the determined quality visit measure.

17. The system of claim 16, wherein the instructions further comprise instructions to determine from the determined number of actual visits to the physical location a plurality of visitor counts, each of the plurality of visitor counts associated with a predetermined number of actual visits and equal to a number of individuals among the one or more individuals determined to have the predetermined number of actual visits to the physical location, and to weight the quality visit measure based upon the plurality of visitor counts.

18. The system of claim 16, further comprising instructions to:
detect a recommendation of the physical location made by a first individual; and
determine from the determined group of computing interactions an actual visit made to the physical location by a second individual after the recommendation made by the first individual;
wherein the instructions that determine the quality visit measure for the physical location determine the quality visit measure further based at least in part on the determined actual visit made to the physical location by the second individual after the recommendation made by the first individual.

19. The system of claim 16, further comprising instructions to:
determine from the determined group of computing interactions a first actual visit made to the physical location by a first individual; and
determine from the determined group of computing interactions a second actual visit made to the physical location by a second individual that is a friend of the first individual;
wherein the instructions that determine the quality visit measure for the physical location determine the quality visit measure further based at least in part on the second actual visit being made to the physical location by the second individual after the first actual visit made by the first individual.

20. At least one non-transitory computer-readable medium comprising instructions that, in response to execution of the instructions by a computing system, cause the computing system to:
access one or more databases to determine a group of computing interactions by one or more individuals pertaining to a physical location, wherein the group of computing interactions by the one or more individuals is indicative of one or more positive social media interactions associated with a friend and an actual visit to the physical location by the one or more individuals;
determine based at least in part on the determined group of computing interactions and one or more criteria, a number of the one or more positive social media interactions associated with a friend and actual visits to the physical location by each of the one or more individuals, wherein the one or more criteria comprise a duration of each of the one or more individuals at the physical location exceeding a minimum duration, and wherein the duration of each of the individuals at the physical location is based at least in part on signals associated with the group of computing interactions and indicative of the one or more individuals being within a particular radius of the physical location;

determine a quality visit measure for the physical location based at least in part on the determined number of the one or more positive social media interactions with a friend and the actual visits to the physical location by each of the one or more individuals, including weighting the quality visit measure to emphasize greater numbers of the one or more positive social media interactions with a friend and repeat visits by an individual among the one or more individuals; and control a computer response to a query associated with the physical location using the determined quality visit measure.

\* \* \* \* \*